(12) United States Patent
Chase et al.

(10) Patent No.: US 8,702,143 B2
(45) Date of Patent: Apr. 22, 2014

(54) SLIDE-ROOM FOR RECREATIONAL VEHICLE

(71) Applicant: Composite Solutions, Inc., Junction City, OR (US)

(72) Inventors: Jeffrey Chase, Eugene, OR (US); Dennis Dame, Harrisburg, OR (US)

(73) Assignee: Composite Solutions, Inc., Junction City, OR (US)

( * ) Notice: Subject to any disclaimer, the term of this patent is extended or adjusted under 35 U.S.C. 154(b) by 0 days.

(21) Appl. No.: 13/906,086

(22) Filed: May 30, 2013

(65) Prior Publication Data

US 2013/0257080 A1    Oct. 3, 2013

Related U.S. Application Data

(63) Continuation of application No. 13/237,746, filed on Sep. 20, 2011, now Pat. No. 8,454,072.

(60) Provisional application No. 61/384,647, filed on Sep. 10, 2010.

(51) Int. Cl.
*B60P 3/34* (2006.01)

(52) U.S. Cl.
USPC ...................................................... 296/26.13

(58) Field of Classification Search
USPC ......... 296/26.01, 26.12, 26.13, 156, 165, 172
See application file for complete search history.

(56) References Cited

U.S. PATENT DOCUMENTS

| | | | |
|---|---|---|---|
| 4,913,485 A | 4/1990 | Moffatt et al. | |
| 5,735,639 A | 4/1998 | Payne et al. | |
| 6,149,218 A | 11/2000 | Tremblay et al. | |
| 6,224,126 B1 | 5/2001 | Martin et al. | |
| 6,325,437 B2 | 12/2001 | Hiebert et al. | |
| 6,402,216 B1 | 6/2002 | McManus et al. | |
| D460,721 S | 7/2002 | Rex | |
| 6,422,628 B1 | 7/2002 | Bortell | |
| D461,144 S | 8/2002 | Rex | |
| 6,527,336 B2 | 3/2003 | Hernandez et al. | |
| 6,536,821 B1 | 3/2003 | Gardner | |
| 6,575,514 B2 | 6/2003 | McManus et al. | |
| 6,712,414 B2 | 3/2004 | Morrow | |
| D488,744 S | 4/2004 | Ciarfello | |
| 6,729,677 B2 | 5/2004 | Gurdjian et al. | |
| D522,923 S | 6/2006 | Genung | |
| 7,354,088 B2 | 4/2008 | Garceau et al. | |
| 7,527,313 B2 | 5/2009 | Peter | |
| 7,614,675 B2 | 11/2009 | Kunz | |
| 7,717,485 B1 | 5/2010 | Hanser et al. | |

(Continued)

OTHER PUBLICATIONS

Photographs of various slide-rooms, publicly used prior to Jan. 20, 2010.

(Continued)

*Primary Examiner* — Hilary Gutman
(74) *Attorney, Agent, or Firm* — Klarquist Sparkman, LLP

(57) ABSTRACT

A slide-room for installation in a recreational vehicle or other structure is disclosed. The slide-room comprises a shell, which can be constructed from fiberglass. The shell comprises an end wall, a ceiling, a floor, two opposing side walls, and a flange extending from the end wall, wherein the end wall, the ceiling, the floor, the side walls and the flange comprise a one-piece, unitary construction. Also disclosed are methods for molding composite components, such as slide-room. In one specific implementation, the shell for a slide-room is formed from fiberglass using a vacuum assisted resin transfer process.

19 Claims, 15 Drawing Sheets

(56) References Cited

U.S. PATENT DOCUMENTS

| | | |
|---|---|---|
| 7,731,256 B1 | 6/2010 | Wivinis |
| 8,141,927 B2 | 3/2012 | Kreil |
| 2007/0194586 A1 | 8/2007 | Gardner |
| 2008/0073925 A1 | 3/2008 | Ksiezopolski et al. |
| 2008/0211130 A1 | 9/2008 | Rydin et al. |
| 2008/0308960 A1 | 12/2008 | Rydin et al. |
| 2012/0035813 A1 | 2/2012 | Kreil |

OTHER PUBLICATIONS

Office Action from the United States Patent & Trademark Office in co-pending U.S. Appl. No. 29/383,703, dated Jun. 27, 2012.
Office Action from the United States Patent & Trademark Office in co-pending U.S. Appl. No. 13/237,746, dated Aug. 14, 2012.
Office Action from the United States Patent & Trademark Office in co-pending U.S. Appl. No. 29/383,703, dated Jan. 4, 2013.
Statement of Dennis Dame, dated Feb. 5, 2013, 4 pages.
Notice of Allowance from the United States Patent & Trademark Office in co-pending U.S. Appl. No. 13/237,746, dated Mar. 11, 2013.

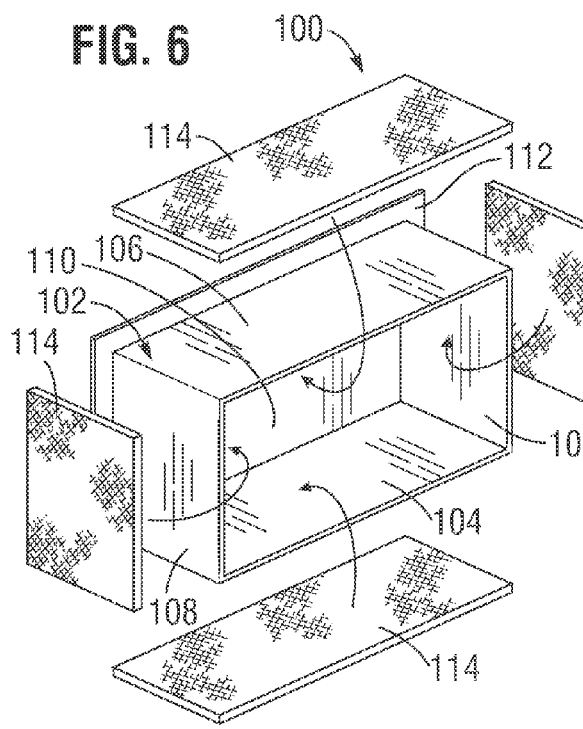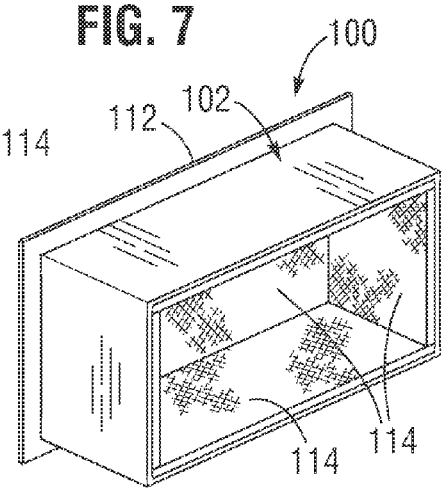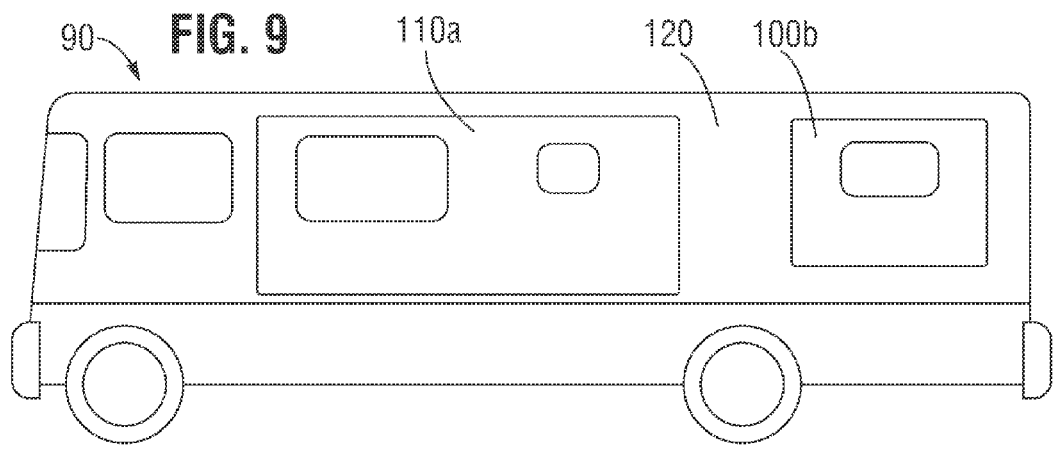

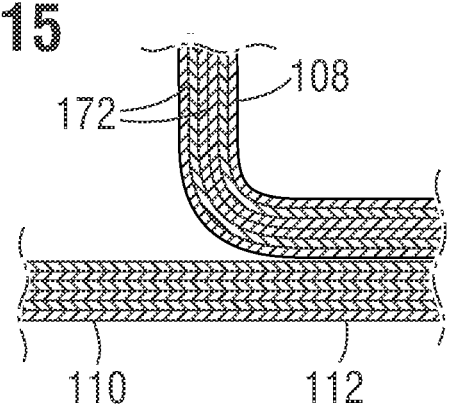
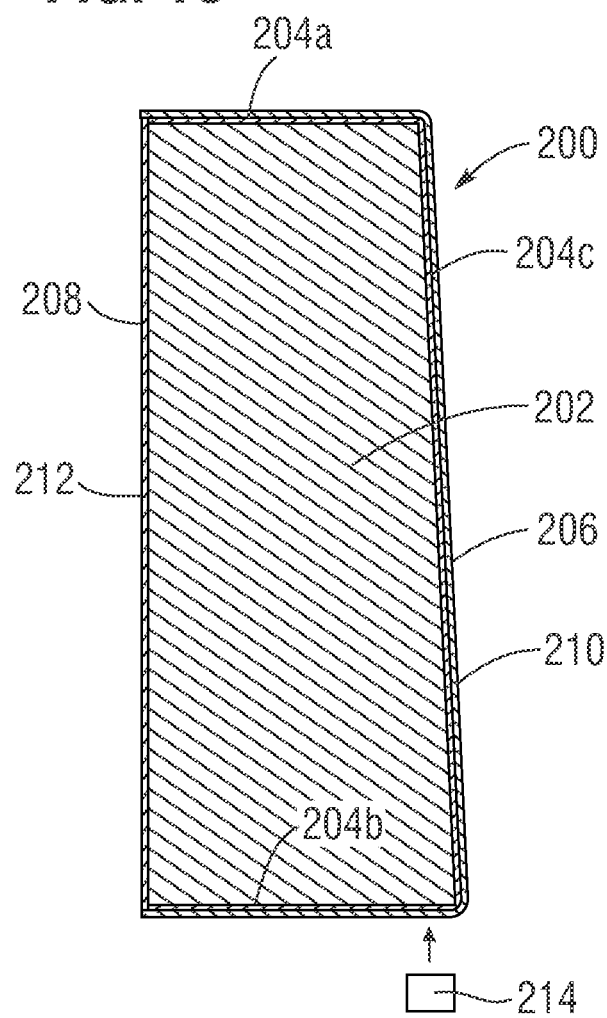

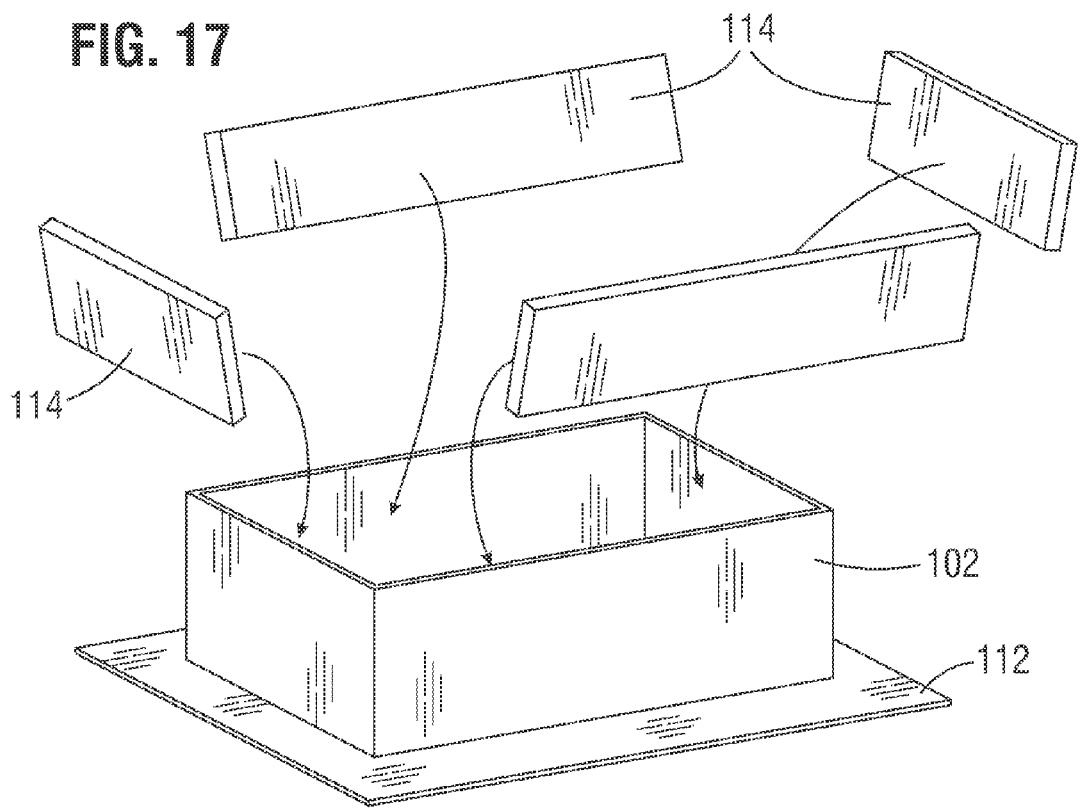
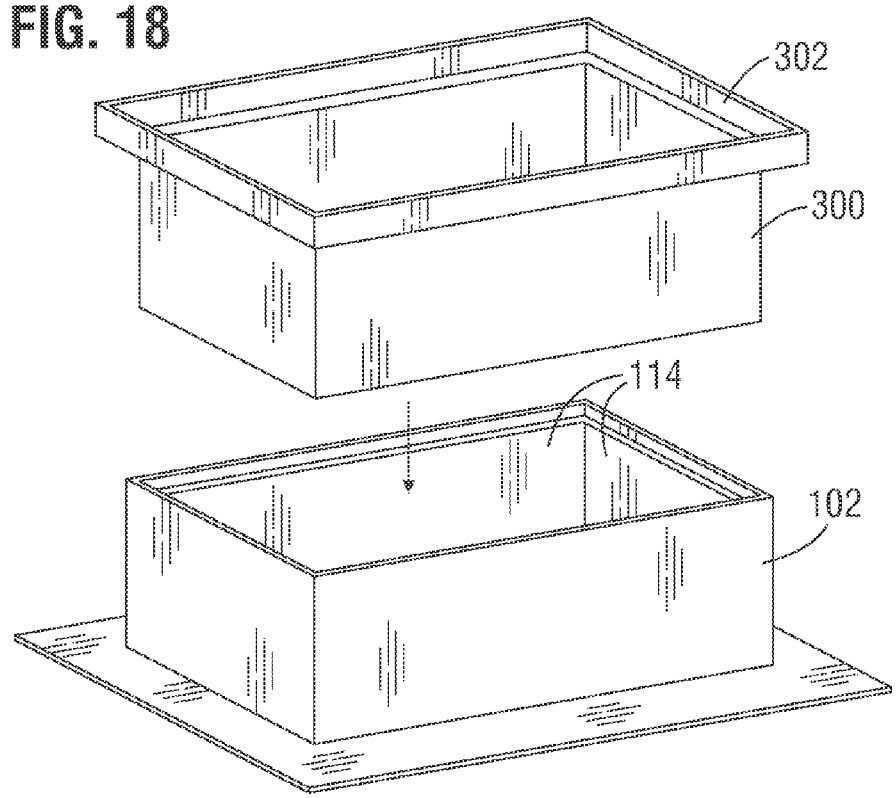

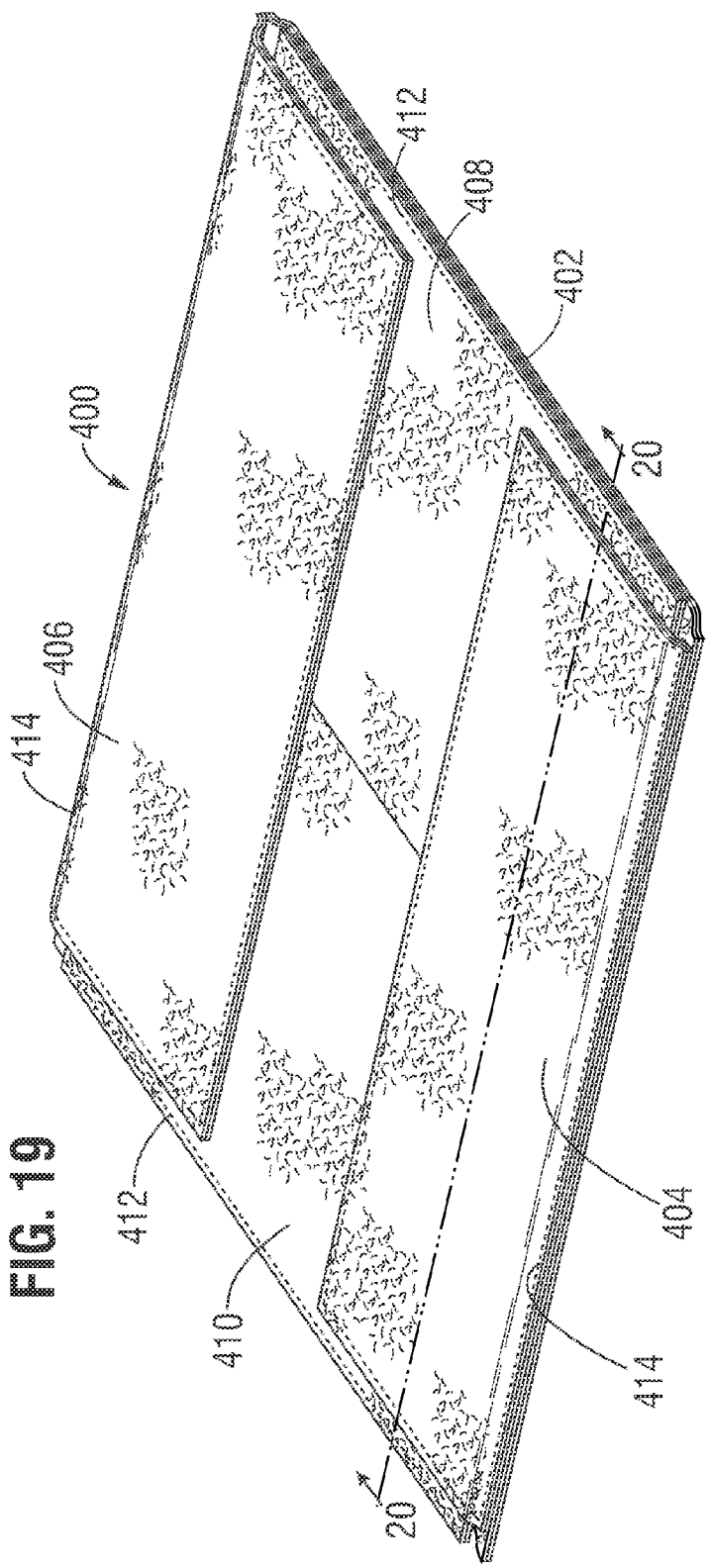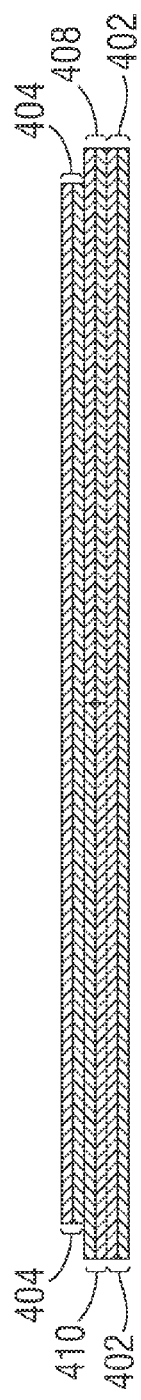

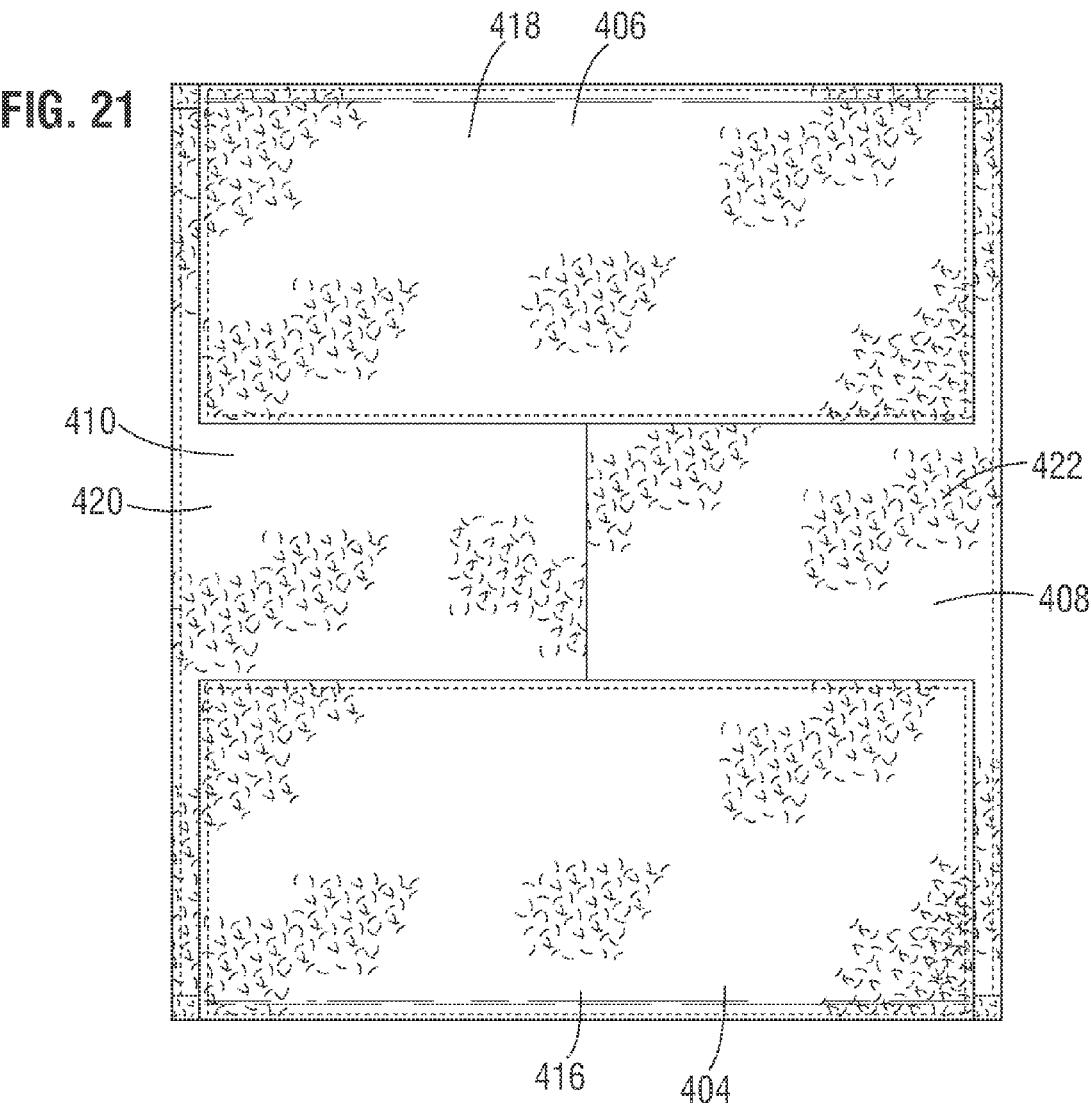

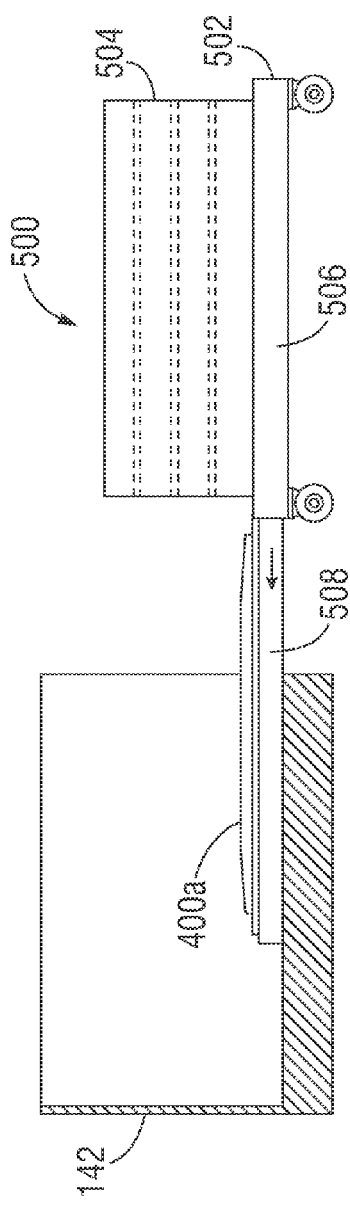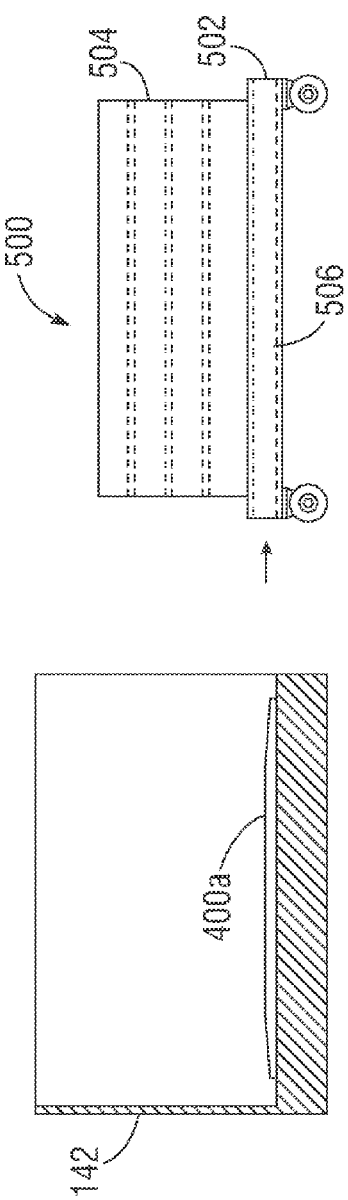

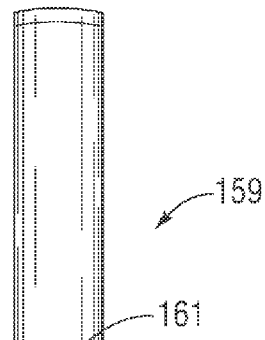
FIG. 26
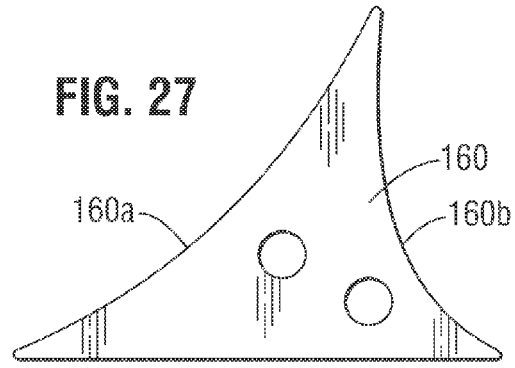
FIG. 27
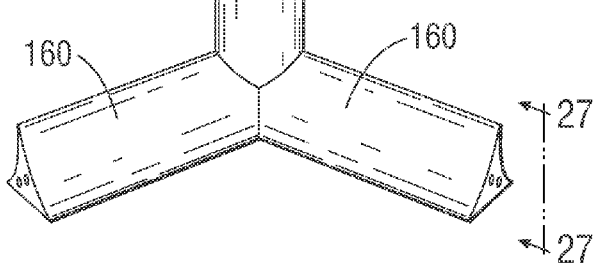

SLIDE-ROOM FOR RECREATIONAL VEHICLE

CROSS REFERENCE TO RELATED APPLICATIONS

The present application is a continuation of U.S. patent application Ser. No. 13/237,746, filed on Sep. 20, 2011 which claims priority to and the benefit of U.S. Provisional Application No. 61/384,647, filed on Sep. 20, 2010, both of which applications are incorporated herein by reference.

FIELD

The present application pertains to embodiments of a slide-room for a recreation vehicle, and methods for manufacturing a slide-room.

BACKGROUND

Generally speaking, a recreational vehicle is any type of vehicle that has a living space, such as a kitchen, bathroom, sleeping area, etc. Recreational vehicles typically are classified in one of two different categories—motorhomes and towables. Motorhomes have an engine and integral driver compartment and therefore can be driven under their own power, while a towable must be coupled to and towed behind a driven vehicle for travelling from place to place.

A variety of recreational vehicles, including motorhomes and towables, are known that have a room or room portion that can be moved from a retracted position while the vehicle is being driven to an extended position when the vehicle is stationary to provide additional internal space. Such expandable rooms are commonly referred to as slide-rooms, slide-outs, slide-houses, slide-boxes, and tip-outs. A slide-room usually includes a floor, a roof, an external end wall (also referred to as a "face" or "face wall") (typically generally parallel to the vehicle side wall), an open (or openable) interior end wall, and one or more side walls (typically generally perpendicular to the vehicle side wall). These components are typically made of frame members and wall panels. In the retracted position, the roof, floor and side walls are typically concealed from exterior view and the room exterior end wall forms a portion of the vehicle side wall.

Various mechanisms are known for moving a slide-room between its expanded and retracted positions. A slide-room typically has an electric motor operatively coupled to a set of gears, cables, chains, and/or hydraulic arms configured to move the slide-room from its retracted position to its expanded position, and vice versa. A slide-room typically slides on a low-friction surface, such as UHMW, or if the slide-room is particularly heavy, it can ride on a set of rollers as it moves between its expanded and retracted positions.

Referring to FIG. 1A, the traditional method of constructing a slide-room includes separately forming the five main components (also referred to as panels) of the slide-room (the end wall 10, two side walls 12, the floor 14, and the roof 16). Thereafter, the main components are secured to each other using mechanical fasteners such as bolts and screws to form a box-like structure as depicted in FIG. 1B. Each main panel typically comprises an outer skin formed from fiberglass or aluminum, an insulating layer (e.g., Styrofoam) glued to the outer skin, and an inner layer of plywood glued to the insulating layer opposite the outer skin. Embedded within the insulating layer are aluminum or steel reinforcing members that receive the bolts or other fasteners used for securing the main panels to each other.

After the box is assembled, exterior flanges 18, usually formed from extruded aluminum, are screwed or riveted around the outside edge of the slide-room, as depicted in FIGS. 2A and 2B. Brackets or channeling 20 typically are secured to the outer corners formed by the intersection of the side walls with the floor and the ceiling, as depicted in FIG. 2C. FIG. 3A shows a prior art exterior flange in the form of a T-shaped bracket 22 that is secured to the outside edge of a slide-room. FIG. 3B shows another prior art exterior flange in the form of an L-shaped bracket 26 that mounts behind skin portion 28 and capped off with U-shaped channel member 30. Skin portion 28 is part of end wall 10 that extends beyond side wall 12. After all of the components of the slide-room are assembled, the joints between all adjoining components must be carefully caulked with a sealant to minimize leakage.

In a typical prior art slide-room configuration, the vehicle body is formed with a main opening sized to receive the side walls 12, floor 14 and roof 16 of the slide-room, and an optionally a recessed portion surrounding the main opening for receiving the exterior flange to form what is referred to as a flush-mounted slide-room. FIG. 4, for example, schematically shows the installation of a slide-room having the flange configuration shown in FIG. 3A. FIG. 4 shows a vehicle body 50 having a main opening 52, and an exterior surface 54 surrounding the main opening. As shown, the body of the slide-room extends inwardly through the main opening 52 and the exterior flange 22 is positioned to contact the exterior surface 54 when the slide-room is in its retracted position. FIG. 5 shows the installation of a slide-room having the flange configuration shown in FIG. 3B. In this installation, the vehicle body 50 has a recessed portion 56 surrounding the main opening 52. The flange (formed by skin portion 28, bracket 26, and channel member 30) is received in the recessed portion 56 when the slide-room is in its retracted position. During assembly and installation of the slide-room, the channel member 30 is adjusted to minimize the gap g between the edge of the flange and the side surface 58 of the recessed portion 56.

The prior art slide-room configurations suffer from many disadvantages. A major problem of known slide-room configurations is that they are extremely susceptible to water leakage through the joints between adjacent panel members that form the slide room and through the spaces between the slide-room and the vehicle opening. Warranty costs of RV manufacturers to repair water damage caused by faulty slide-room designs can be significant.

In order to minimize leaks in the area between the slide-room and the vehicle opening, manufactures have provided a sweeper seal around the edge of the vehicle opening to sweep off water on the slide-room as it is retracted into the vehicle. The problem with this technique is that the channel members and/or molding placed along the joints of the slide-room (e.g., channel members 20 in FIG. 2C) create high spots along the outer surface of the slide-room that prevent the sweeper seal from making complete contact with the slide-room. RV manufacturers also place rubber flange seals on the rear surface of the exterior flange 18 to minimize leakage between the exterior flange and the abutting surface of the vehicle when the slide-room is in its retracted position. Unfortunately, the performance of the flange seals is reduced because gaps or surface irregularities along the surface of flange can prevent the flange from making full contact with the seal. Water leakage is such a significant problem within the RV industry that some manufactures provide modified rain gutters along the lower longitudinal edges of the sides of the slide-room to collect rainwater and direct it outwardly through the vehicle opening.

Another significant problem of known slide-room configurations is that conventional techniques for molding the individual walls that make up the slide-room introduce significant manufacturing variances between different components. As a result, it is often difficult to assemble a slide-room that is completely plumb and fits easily into the vehicle opening. To address this problem, RV manufacturers typically oversize the vehicle opening 52 and recessed area 56 (FIG. 4) to allow the slide-room to be installed in the vehicle. Unfortunately, this introduces additional paths for water to leak into the vehicle and detracts from the overall aesthetics of the vehicle because there is an obvious gap between the face of the slide-room and the adjacent surrounding surface of the vehicle.

Another drawback of conventional slide-room configurations relates to the process of painting the vehicle and the installed slide-room. Today's high-end RV's typically are provided with complicated, multicolored paint jobs. The detailing work required to mask-off portions of the vehicle to create each stripe or shape of a specific color is a pain-staking and time-consuming process. Masking over the areas where the face of the slide-room meets the surrounding vehicle wall is especially difficult and labor intensive because special attention is needed to make sure that the masking tape lies completely flat against the raised surfaces created by molding that extends around the face of the slide-room.

As can be appreciated, there exists a strong need for a new and improved slide-room and methods for its manufacture.

SUMMARY

In one representative embodiment, a slide-room comprises a shell. The shell comprises an end wall, a ceiling, a floor, two opposing side walls, and a flange extending from the end wall, wherein the end wall, the ceiling, the floor, the side walls and the flange comprise a one-piece, unitary construction.

In another representative embodiment, a vehicle has a wall comprising a slide-room opening and a slide-room installed in the opening. The slide-room is operable to move between a retracted position disposed mostly inside of the vehicle and an extended position extending outwardly from the vehicle wall. The slide-room comprises a fiberglass shell that comprises an end wall, a ceiling, a floor, two opposing side walls, and a flange extending from the end wall and overlapping an outer surface of the vehicle wall, wherein the end wall, the ceiling, the floor, the side walls and the flange comprise a one-piece, unitary construction.

In another representative embodiment, a slide-room comprises a fiberglass shell comprising an end wall, a ceiling, a floor, two opposing side walls, and a flange extending from the end wall, wherein the end wall, the ceiling, the floor, the side walls and the flange comprise a one-piece, unitary construction. The flange can extend beyond the corners of the shell formed by the intersection of each of the ceiling, the floor, and the side walls with the end wall. The shell desirably is constructed such that there are no fasteners connecting the end wall, the ceiling, the floor, the side walls and the flange to each other. The outside corners of the shell defined by the intersection of each of the ceiling, the floor, and the side walls with the end wall desirably are curved. At least one of the ceiling, the floor, and the side walls is formed from one or more layers of fiberglass matting that also form part of the flange. The entire extent of the outer surface of the flange desirably is co-planer with an outer surface portion of the end wall that is immediately adjacent the flange.

In yet another representative embodiment, a method for forming a slide-room comprises providing a mold comprising a plurality of mold walls and a floor defining a mold cavity; positioning a plurality of mandrels in the mold cavity, each mandrel having a lower surface spaced above the floor of the mold; positioning a fiberglass preform in the mold cavity such that a first section of the preform extends along the mold floor, an edge portion surrounding the first section extends into spaces between the mold floor and the lower surfaces of the mandrels, and second, third, fourth, and fifth sections of the preform are folded upwardly against adjacent surfaces of respective mandrels; introducing a resin into the mold so that it flows over and through the preform; and allowing the resin to cure to form a fiberglass slide-room shell, the slide-room shell having an end wall formed by the first section of the preform, a flange formed by the edge portion of the preform, and a floor, a ceiling, and opposing side walls formed by the second, third, fourth, and fifth sections section of the preform, respectively.

In yet another representative embodiment, a method for forming a composite component comprises providing a mold comprising a plurality of mold walls and a floor defining a mold cavity; positioning at least one mandrel in the mold cavity, the mandrel having a lower surface spaced above the floor of the mold; positioning a preform in the mold cavity such that a first section of the preform extends along the mold floor, an edge portion of the first section extends into space between the mold floor and the lower surface of the mandrel, and a second section of the preform extends along a side surface of the mandrel at angle relative to the first section; introducing a resin into the mold so that it flows over and through the preform; and allowing the resin to cure to form a composite component from the preform and the resin, the composite part having a first wall formed by the first section of the preform, a flange formed by the edge portion, and a second wall formed by the second section of the preform.

In still another representative embodiment, a molding apparatus for forming a composite component comprises a mold. The mold comprises a plurality of mold walls and a floor defining a mold cavity, the mold having an opening in one side thereof providing access to the mold cavity. The apparatus further includes a preform loader comprising a base positioned adjacent the opening in the mold and a movable preform support that is movable horizontally relative to the base between a retracted position outside the mold cavity and an extended position inside of the mold cavity. The preform support is configured to support a preform and move the preform from a position outside of the mold cavity to a position inside of the mold cavity when the support is moved from the retracted position to the extended position.

The foregoing and other features and advantages of the invention will become more apparent from the following detailed description, which proceeds with reference to the accompanying figures.

BRIEF DESCRIPTION OF THE DRAWINGS

FIG. 6 is an exploded view of a slide-room for a vehicle, according to one embodiment.

FIG. 7 is a perspective view of the slide-room shown in FIG. 6.

FIG. 8 is an enlarged side view of a portion of an interior panel of the slide-room of FIG. 6.

FIG. 9 is a side view of a vehicle and two different size slide-rooms of the type shown in FIG. 6 installed in the vehicle.

FIG. 15 is an enlarged, cross-sectional view of a portion of a slide-room shell formed in the molding assembly.

FIG. 16 is a cross-sectional view of a mandrel used in the molding assembly of FIG. 12.

FIG. 17 illustrates the insertion of interior panels into the shell of a slide-room.

FIG. 18 illustrates the insertion of a vacuum bag in the slide-room shown in FIG. 17 to assist in bonding the interior panels to the interior of the shell.

FIG. 19 is a perspective view of a fiberglass preform that can be used to form a slide-room shell in the molding assembly shown in FIG. 12.

FIG. 20 is a side elevation view of the preform of FIG. 19 viewed along line 20-20.

FIG. 21 is a top plan view of the preform of FIG. 19.

FIG. 24 is a side elevation of the mold and the preform loading apparatus of FIG. 22, showing the movable preform support extending into the mold.

FIG. 25 is a side elevation view similar to FIG. 24, but showing the movable preform support retracted after a preform has been loaded in the mold.

FIG. 26 is a perspective view of a corner caul plate assembly, according to one embodiment.

FIG. 27 is an enlarged side elevation view of a caul plate.

DETAILED DESCRIPTION

Figure 1A:
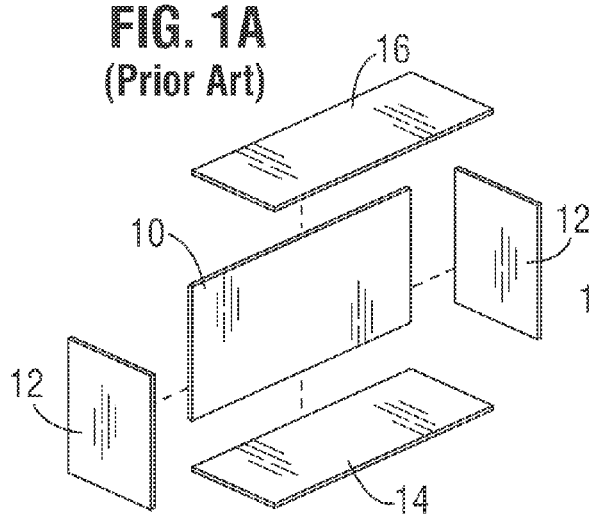
FIGS. 1A-1B and 2A-2C illustrate a prior art technique for constructing a slide-room for a vehicle.
Figure 1B:
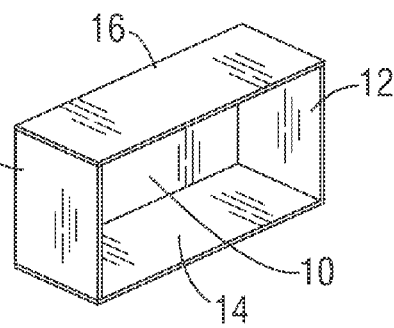
Figure 2A:
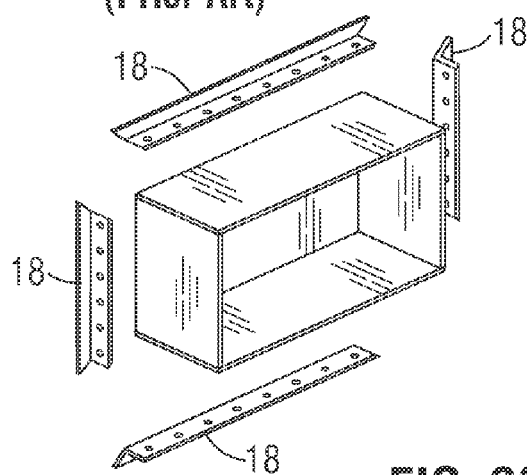
Figure 2B:
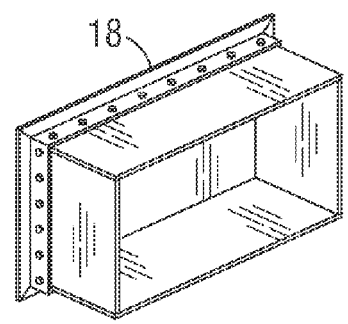
Figure 2C:
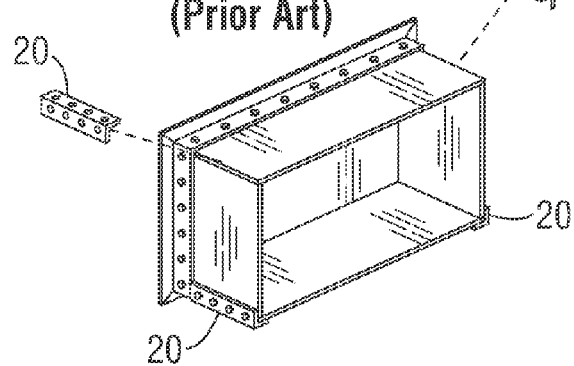

As used in this application and in the claims, the singular forms "a," "an," and "the" include the plural forms unless the context clearly dictates otherwise. Additionally, the term "includes" means "comprises." Further, the terms "coupled" and "associated" generally means electrically, electromagnetically, and/or physically (e.g., mechanically or chemically) coupled or linked and does not exclude the presence of intermediate elements between the coupled or associated items.

Although the operations of exemplary embodiments of the disclosed method may be described in a particular, sequential order for convenient presentation, it should be understood that disclosed embodiments can encompass an order of operations other than the particular, sequential order disclosed. For example, operations described sequentially may in some cases be rearranged or performed concurrently. Further, descriptions and disclosures provided in association with one particular embodiment are not limited to that embodiment, and may be applied to any embodiment disclosed.

Moreover, for the sake of simplicity, the attached figures may not show the various ways (readily discernable, based on this disclosure, by one of ordinary skill in the art) in which the disclosed system, method, and apparatus can be used in combination with other systems, methods, and apparatuses. Additionally, the description sometimes uses terms such as "produce" and "provide" to describe the disclosed method. These terms are high-level abstractions of the actual operations that can be performed. The actual operations that correspond to these terms can vary depending on the particular implementation and are, based on this disclosure, readily discernible by one of ordinary skill in the art.

The present disclosure concerns embodiments of a slide-room for a vehicle and methods for manufacturing the same. FIGS. 6 and 7 are exploded and perspective views, respectively, of a slide-room 100, according to one embodiment. The slide-room 100 comprises a shell, or main body, 102, which has a floor 104, a ceiling 106, opposing side walls 108, and an end wall 110 (also referred to as the face or face wall of the slide room). The shell 102 has an open end opposite the end wall 110 which provides access to the living space inside of the slide-room 100. The shell 102 also has an integral flange 112 surrounding the outer edge of the end wall. The shell 102 desirably has a one-piece, unitary construction, meaning that the floor 104, ceiling 106, side walls 108, end wall 110, and flange 112 are formed without any fasteners, welds, or adhesives securing the various components to each other. As explained in detailed below, all of these components of the shell 102 can be formed at the same time in a mold. In particular embodiments, the shell is constructed from fiberglass, which is a composite material formed from glass fiber matting and a resin. In other embodiments, the shell can be constructed from other types of composite materials formed from a suitable matrix material and a reinforcement material, such as carbon fibers.

In the illustrated embodiment, the flange 112 extends around the entire extent of the end wall 110. In other embodiments, however, the flange 112 can extend less than around the entire extent of the end wall 110. For example, in one implementation, the flange 112 can extend from end wall 110 at the corners of the end wall and the ceiling and the side walls, but does not extend from the corner of the end wall and the floor.

Each of the floor 104, ceiling 106, side walls 108, and end wall 110 can have a respective interior panel 114 secured thereto (for clarity, FIG. 6 does not show the interior panel 114 that is secured to the interior surface of the end wall 110). Each interior panel 114 can be adhesively secured to a respective inner surface of the shell using a suitable adhesive such as a urethane adhesive. As explained in greater detail below, all of the interior panels 114 can be secured to the shell 102 at the same time in a vacuum bonding process. As shown in FIG. 8, an interior panel 114 can comprise an insulation layer 116 and a skin 118 adhesively secured to the insulation layer with a suitable adhesive such as a urethane adhesive. The insulation layer 116 can comprise, for example, polystyrene or other suitable materials known in the art. The skin 118 can include one or more layers of material, such as a protective layer of plywood secured to the insulation layer and a decorative layer secured to the protective layer forming the inner surface of the slide-room.

A vehicle can have one or more slide-rooms of the same size and shape or different sizes and/or shapes. As used herein, the term "vehicle" refers generally to any vehicle that has a power source (e.g., motor or engine) or a towable vehicle that is coupled to a driven vehicle for travelling from place to place. A vehicle can include, without limitation, a folding camping trailer, a truck camper, a conventional travel trailer, a fifth wheel travel trailer, a sport utility recreational vehicle, a motorhome (e.g., class A, B, and C motorhomes), a horse trailer, a military trailer, or a utility trailer, to name a few. The embodiments of slide-rooms disclosed herein can also be installed in less mobile structures that have limited space, such as mobile homes, house boats, mobile offices or command centers. If desired, the slide-rooms can also be installed in permanent structures, such as houses, stores, etc. The embodiments of slide-rooms disclosed herein can be used for any purpose once installed in a vehicle (or other structures), such as a galley, kitchen, bedroom, dinette, closet, vanity, bathroom, living room, or bonus room. The slide-room can also be a full wall slide-room.

FIG. 9, for example, shows a vehicle 90 having a first, large slide-room 100a and a second, smaller slide room 100b installed in the side wall 120 of the vehicle. As shown in FIG. 11, the vehicle wall 120 includes a main opening 122 that receives the slide-room 100. The slide-room 100 can move relative to the vehicle wall 120 from a retracted position (shown in FIGS. 10B and 11) to an extended position (FIG. 10A), and vice versa, in the directions indicated by double-headed arrow 124. As shown, the flange 112 overlaps the exterior surface of the vehicle wall 120. Consequently, the vehicle wall need not be formed with a recessed portion surrounding the main opening 122 for receiving the flange as in prior art systems. The slide-room 100 can be supported on the vehicle for movement between its retracted and extended positions using conventional techniques and mechanisms.

Figure 10A:
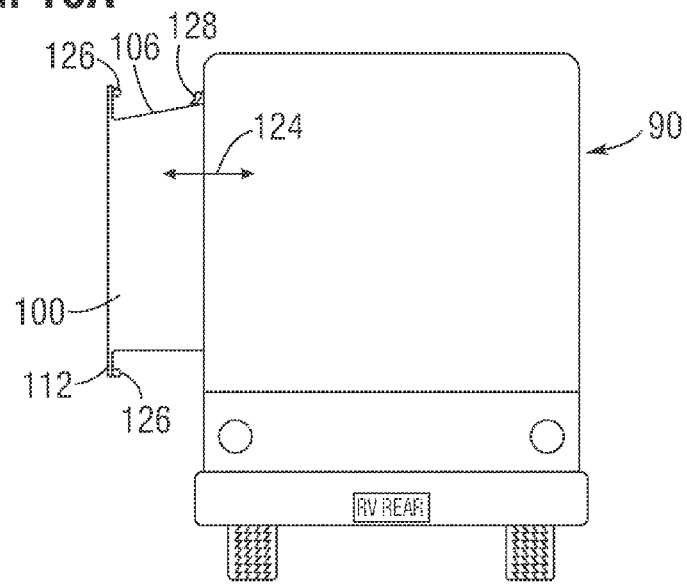
FIGS. 10A and 10B are end views of a vehicle showing the extended and retracted positions, respectively, of a slide-room of the type shown in FIG. 6.
Figure 11:
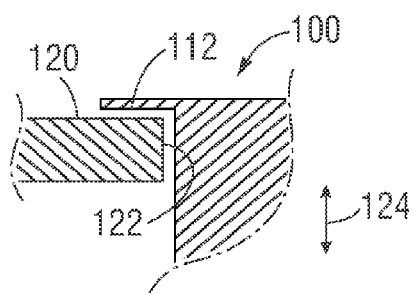
FIG. 11 is an enlarged, cross-sectional view showing a portion of the flange of a slide-room overlapping the adjacent outer surface of a vehicle.

As shown in FIG. 10A, flange seals 126 can be placed on the rear surface of the flange 112 to help seal the flange against the outer surface of the vehicle to minimize the ingress of water into the vehicle. A sweeper seal 128 can be mounted to the vehicle just above the ceiling 106 of the slide-room. The sweeper seal 128 functions to remove standing water from the ceiling 106 as the slide-room is retracted into the vehicle.

Figure 10B:
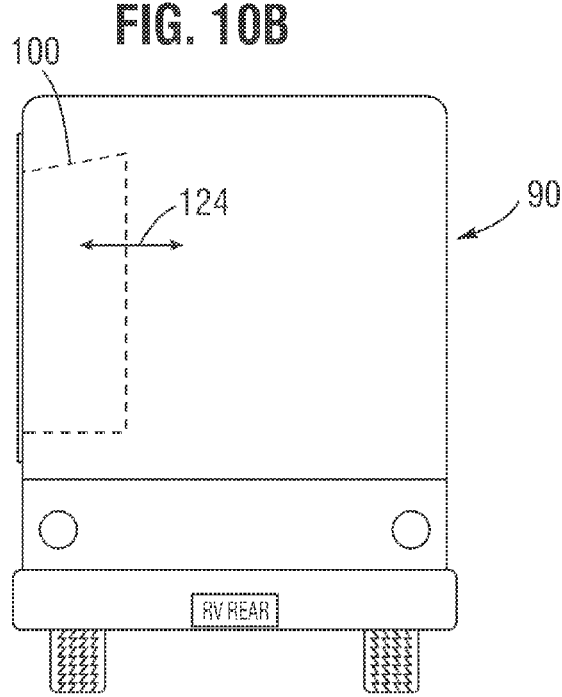

As illustrated in FIGS. 10A and 10B, the ceiling 106 of the slide-room 100 can be non-perpendicular relative to the end wall 110 and can be set at an incline relative to a horizontal plane such that the ceiling slopes downwardly from the open, inside end of the slide-room to the end wall 110. The slope of the ceiling 106 is effective to cause rain water that falls on the ceiling to drain away from vehicle when the slide-room is in its extended position. Alternatively, the ceiling 106 can be parallel to the floor 104 and perpendicular to the end wall 110 and the vehicle side wall 120 (e.g., as shown in the embodiment of FIGS. 6 and 7).

Figure 3A:
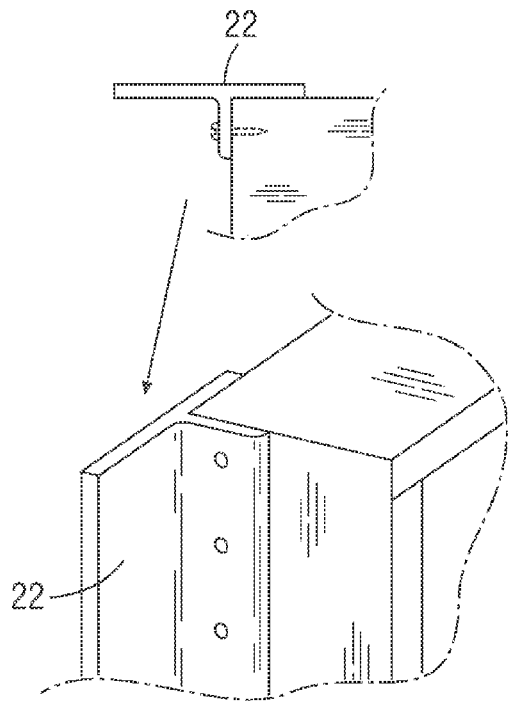
FIGS. 3A and 3B illustrate two different types of prior art exterior flanges used in the construction of slide-rooms.
Figure 3B:
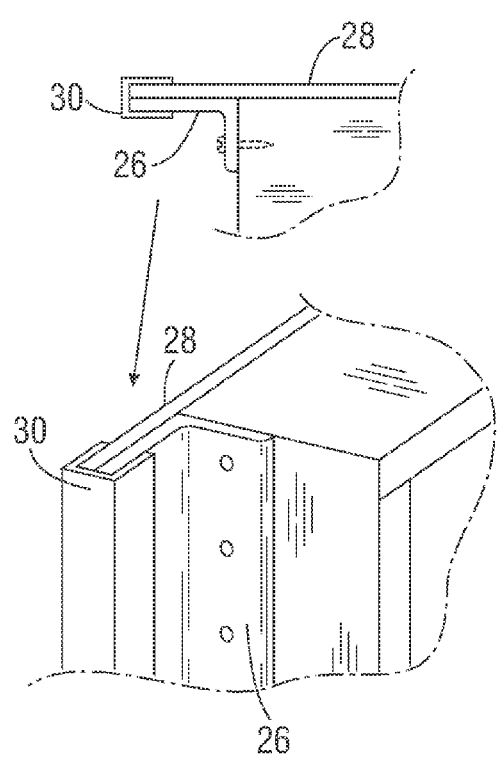
Figure 4:
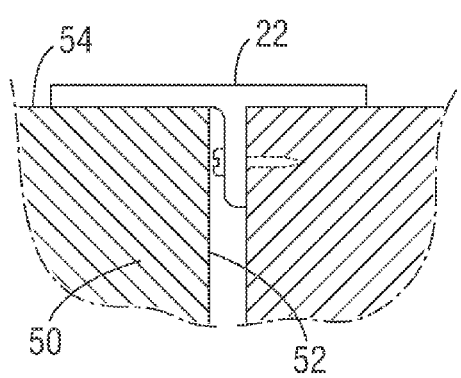
FIG. 4 shows an installed slide-room having the flange construction shown in FIG. 3A.
Figure 5:
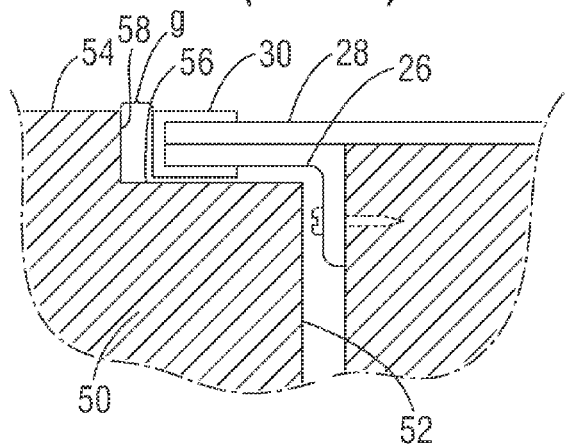
FIG. 5 shows an installed slide-room having the flange construction shown in FIG. 3B.

The illustrated configuration can provide several advantages. For example, the flange 112 can be configured to overlap the vehicle wall around the entire extent of the main opening 122, thereby eliminating any visible gaps between the slide-room and the vehicle wall, which improves the aesthetics of the vehicle. Moreover, since the flange 112 is integrally formed as part of the shell 102, separate components need not be fastened to the shell for forming the flange, as in prior art configurations. The elimination of separate flange components (e.g., flanges 22 of FIG. 3A or flanges 26 of FIG. 3B) reduces material costs and labor associated with installing those components. Advantageously, by eliminating separate flange components, the exterior surface of the slide-room defined by the exterior surfaces of the flange and the end wall 110 can be completely flat and smooth. As a result, the man-hours usually required for detailed work in preparing the vehicle for painting can be significantly reduced. For example, sanding around and taping off the flanges and corner moldings is no longer required. In addition, taping or masking of sections extending across the exterior of the slide-room required for elaborate paint jobs can be accomplished easier and more quickly because the surface irregularities caused by conventional flange components and corner moldings can be eliminated. As can be appreciated, this can result in significant savings in labor costs associated with painting the vehicle. Additionally, because the shell 102 can be formed in one piece, it is much less susceptible to variables in construction, which improves the overall fit and finish of the slide-room, adding better consistency for cabinet installation as well as slide-room installation on the vehicle. Another important advantage of the disclosed slide-room configuration is that it can be provided with improved insulation properties because the amount of metal reinforcing tubing embedded within the slide-room can be greatly reduced or completely eliminated, which in turn increases the overall R-value of the slide-room.

Another significant improvement over the prior art that can be realized by the disclosed slide-room is that water leakage can be greatly reduced by virtue of the one-piece shell design that eliminates leak paths between the walls of the slide-room. In addition, a conventional sweeper seal can be much more effective in removing standing water when used with the disclosed slide-room because surface irregularities that prevent the seal from contacting the outer surface of the slide-room, such as conventional molding and channel members on the outer surface of the slide-room, can be minimized or completely eliminated. Leakage prevention is further improved because the integrally molded flange 112 can improve the performance of the flange seal 126 because the flange can provide a smooth and continuous outer surface that can make full contact with the seal.

Figure 12:
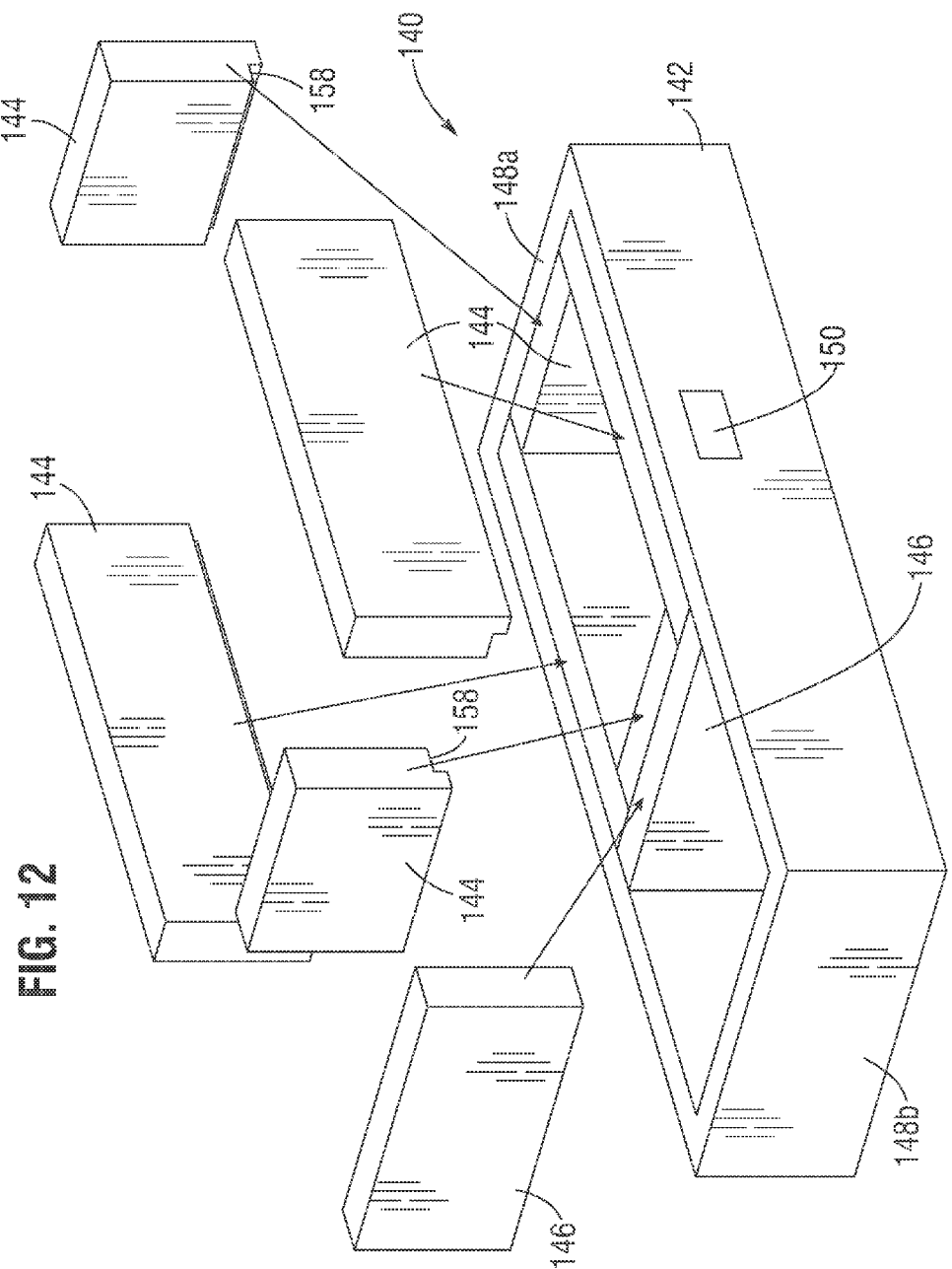
FIG. 12 is a perspective, exploded view of a molding assembly that can be used to form the shell of a slide-room.

FIG. 12 illustrates a molding apparatus 140, according to one embodiment, that can be used to form the shell 102 of the slide-room. In particular embodiments, the molding apparatus 140 is used for forming a fiberglass shell via a vacuum assisted resin transfer molding process. The molding apparatus 140 can include a base mold 142, one or more mandrels 144, and a spacer 146. The mandrels 144 are configured to form the side walls, floor and ceiling of the shell. Also, the mandrels desirably are configured to be removable from the mold 142. In this manner, the mold can be used with a plurality of different sets of mandrels, each of which can be used to form a shell having a different size and shape.

The spacer 146 also can be removable from the mold and its position along the length of the mold can be adjusted to adjust the effective size of the internal mold cavity that receives the mandrels. For example, the spacer 146 can be moved closer to the opposing end wall 148a of the mold to decrease the length of the mold cavity to form a smaller shell 102. Conversely, the spacer 146 can be moved farther away from the opposing end wall 148a to form a larger shell. In addition, the spacer can be used to separate the mold into two separate mold cavities, each of which can be sized for forming a separate shell. For example, a first mold cavity is defined between the spacer and the end wall 148a and a second mold cavity is defined between the spacer and the other end wall 148b of the mold. A first set of mandrels can be installed in the first mold cavity (as shown in FIG. 12) for forming a first shell and a second set of mandrels (not shown) can be installed in the second mold cavity for forming a second shell. In the forming process described below, the two shells can be formed in the mold at the same time. Traditionally, manufacturers use a different mold for forming each of the various components of the shell. As can be appreciated, the mold apparatus 140 can result in significant cost savings and can significantly reduce overall floor space in a manufacturing facility because a single base mold can be used for forming various shells of different shapes and sizes.

Also, although the illustrated embodiment is described in connection with forming a shell for a slide-room, the molding apparatus 140 can be used to form various other products, such as any of various box-shaped products. Some examples of other products that can be formed using the manufacturing techniques disclosed herein include, without limitation, shipping and storage containers (such as for military, medical, commercial and residential applications), structures or houses for equipment (such as pump or generator houses), hot tubs, swimming pools, watering troughs, planter boxes, utility trailer boxes, spill containers, sheds or components for sheds, slide-rooms for kiosks, duck blinds, boats, canopies, and dock structures.

Once the mandrels 144 and the spacer 146 are installed in the mold, they can be secured in place using suitable techniques or mechanisms. In one implementation, for example, the mandrels 144 and the spacer 146 can be held in place against the inside of the mold with magnets 150 (one of which is shown in FIG. 12) placed against the outside surface of the mold. One type of magnet that can be used for this purpose is a PowerLift® magnet model PNL660.

Figure 13:
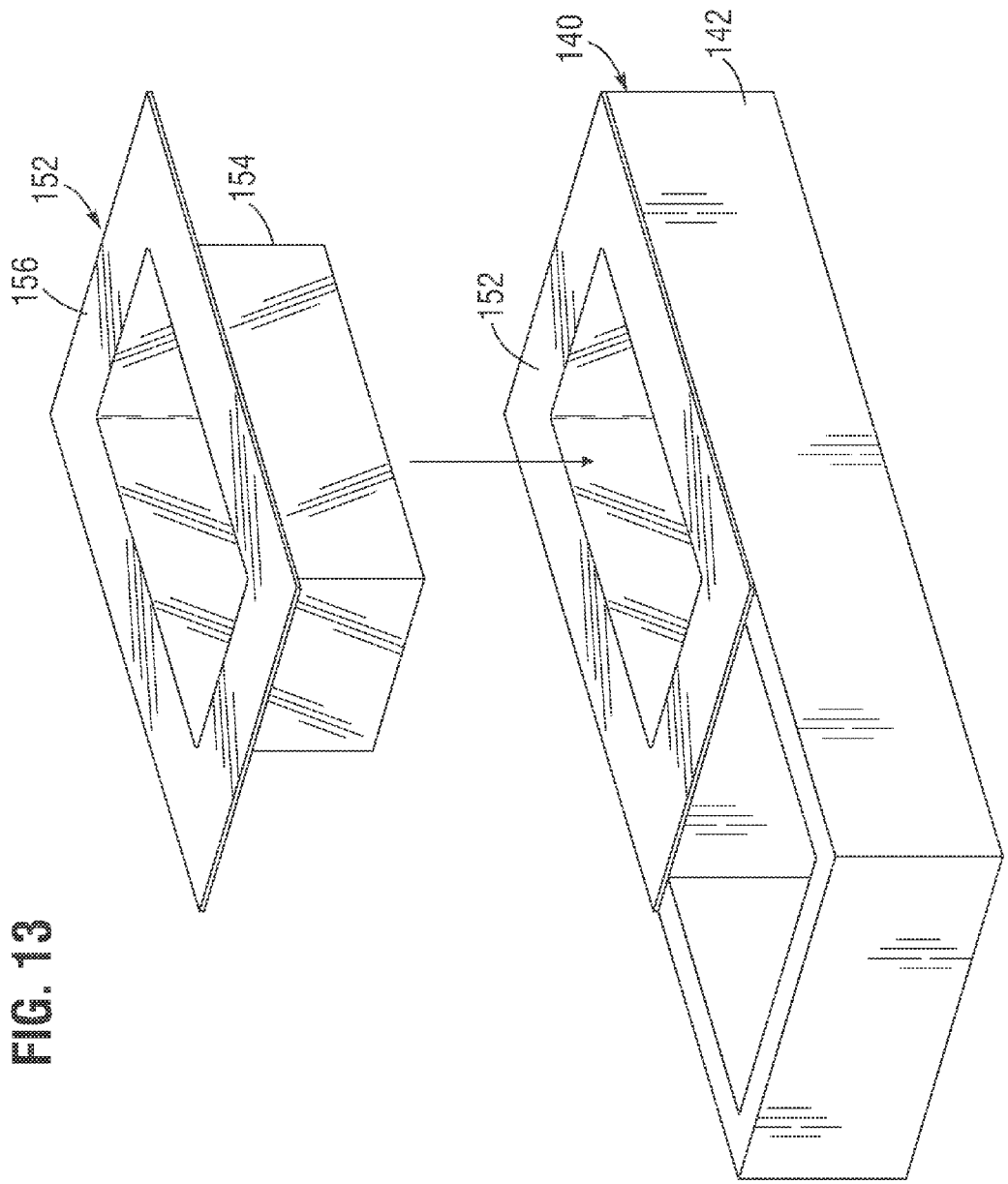
FIG. 13 is a perspective view of the molding assembly of FIG. 12 showing a vacuum bag being installed in the mold for carrying out a vacuum assisted resin transfer process.

Turning now to FIG. 13, the molding apparatus 140 can further include a vacuum bag 152, which can be used for forming the shell via a vacuum assisted resin transfer process. The vacuum bag 152 has a lower body portion 154 shaped to correspond to the inside surfaces of the mandrels and an upper flange portion 156 that is shaped to rest on top of the mandrels and form a seal with the top of the mandrels to assist in forming a vacuum in the space between the lower body portion 154 and the inner surfaces of the mandrel and the floor of the mold. The vacuum bag desirably is formed from natural rubber but suitable synthetic materials, such as nylon, EPDM, silicone, butyl, fluoroelastomers, nitriles, and polyisoprenes also can be used. A method for forming a natural rubber vacuum bag is disclosed in U.S. Patent Application Publication No. 2008/0211130, which is incorporated herein by reference. In a working embodiment, the vacuum bag was formed using Sprayomer™ elastomer manufactured by SR Composites LLC.

Figure 14:
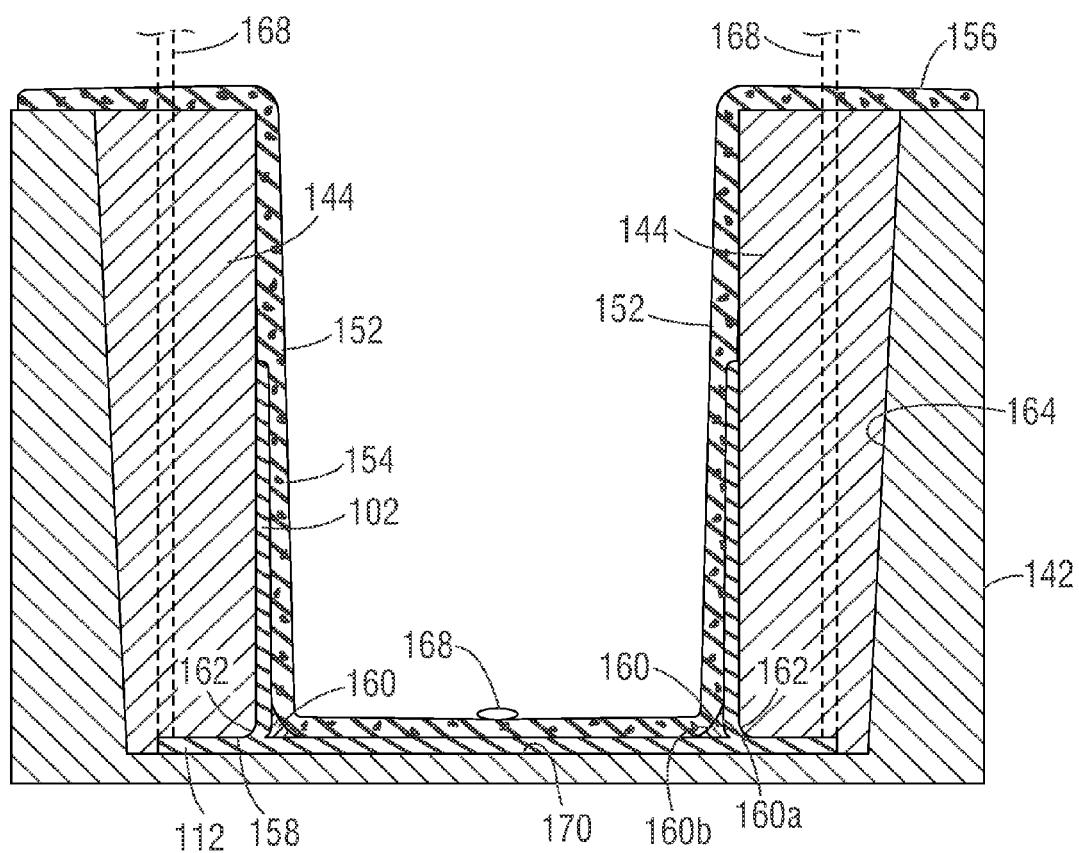
FIG. 14 is a cross-section of the molding assembly shown in FIG. 13.
Figure 22:
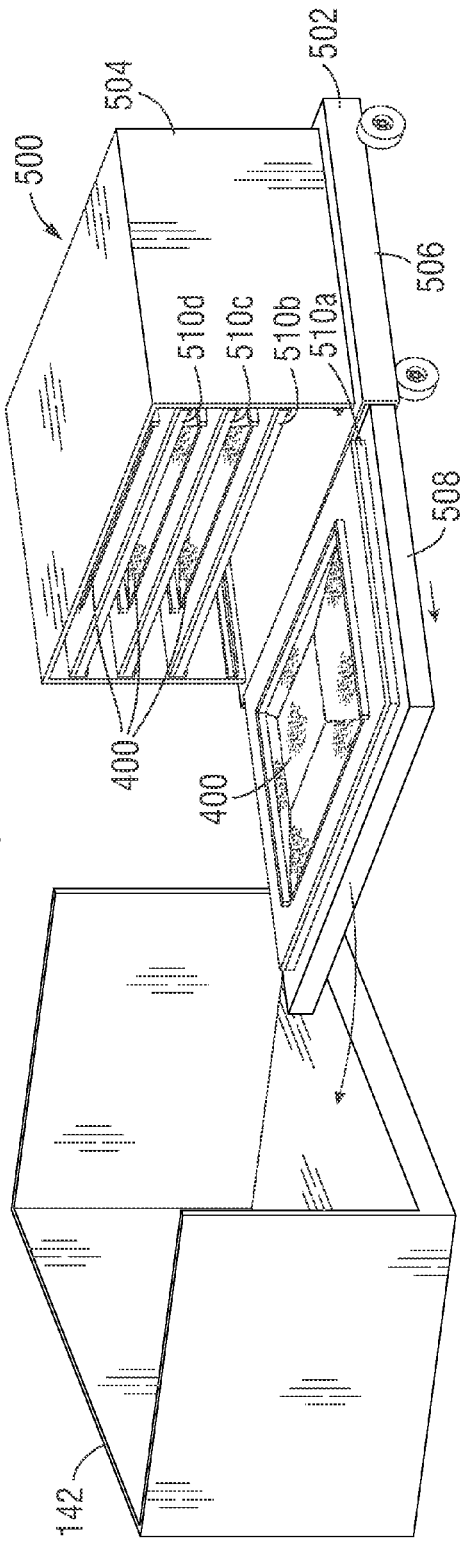
FIG. 22 is a perspective view of a mold and a preform loading apparatus that can be used to load a preform into the mold, shown with the movable preform support in an extended position.

FIG. 14 shows a cross-section of the molding apparatus with the mandrels 144 and the vacuum bag 152 installed in the base mold 142. For purposes of illustration, a molded shell 102 also is shown. The shell can be formed from a fiberglass preform (one or more layers of fiberglass matting) and a resin that is introduced into the space between the vacuum bag and the mandrels. As shown, the inner surfaces of the mandrels are shaped to form the outer surfaces of the side walls, floor, and ceiling of the shell; the floor 170 of the mold is shaped to form the outer surface of the end wall of the shell; and the outer surface of the bag lower portion 154 forms the inner surfaces of the shell. Each mandrel 144 can be formed with a recessed portion 158 at its lower end that creates a small gap between the floor 170 of the mold and the opposing adjacent surface of the mandrel. The gap provides the space required to form the integral flange 112 of the shell. The upright walls of the mold desirably are tapered from the bottom to the top of the mold so as to provide inner side surfaces 164 that extend at an angle offset from perpendicular relative to the floor 170 of the mold. The mandrels can be tapered from top to bottom so as to provide mating outer surfaces that also extend at an angle offset from perpendicular relative to the floor of the mold. The angled surfaces of the mandrels and the mold walls allow the mandrels to be more easily removed from the mold so that the fully formed shell can be removed from the mold after the molding process.

In particular embodiments, inserts 160 (also referred to as caul plates) can be positioned at the bottom of the mold inside the vacuum bag to form the inside corners of the shell at the intersection of the shell end wall with the side walls, floor and ceiling of the shell. The inserts 160 desirably are formed from a resilient and/or elastomeric material, such as silicone rubber, but also can be formed from a relatively non-resilient and non-elastomeric material such as metal. The inserts 160 and the opposing lower edges 162 of the mandrels desirably are shaped to form curved sections at the lower ends of the shell side walls, floor, and ceiling where these components meet the end wall of the shell.

FIG. 15 shows an enlarged, cross-sectional view of a portion of the shell where a side wall 108 intersects the end wall 110 to form the flange 112. As shown, the fiber mats 172 used to form the side wall 108 are curved to form a radiused corner between the side wall 108 and the flange 112. Such curved sections of the shell are advantageous in that they prevent or at least minimize "print-through" of resin on the shell end wall that can occur when the shell expands and contracts due to changes in ambient temperature. In contrast, if the lower ends of the shell side walls, floor, and ceiling form perpendicular corners with the shell end wall 110, then temperature changes can result in print-through of resin in which the resin becomes visible from the outside of shell. The inserts 160 also prevent excess resin from settling at the lower corners of the vacuum bag and forming resin rich sections at those portions of the shell, which is an additional cause of resin print-through.

The shell 102 can be formed from composite materials other than fiberglass using the illustrated molding apparatus, including any of various known fiber-reinforced composite materials, such as carbon fiber or Kelvar. A "preform" (discussed below) as used herein refers to the dry fibrous reinforcing material of the composite structure (before a matrix material, such as a resin, is added). The preform can be woven or non-woven, and/or can have continuous or discontinuous/chopped fibers, and/or can have aligned or random-oriented fibers. Any of various known matrix materials can be used in the molding process. Some examples include polyester, vinyl ester, epoxy, phenolic, polyimide, polyamide, polypropylene, PEEK, to name a few. In some embodiments, pre-impregnated lay-ups (fiber sheets pre-impregnated with a resin) can be used to form the shell 102. Moreover, the molding apparatus can be adapted for other molding processes, such as pressure bag molding.

FIG. 16 is an enlarged cross-sectional view of an exemplary mandrel 200 that can be used with the molding apparatus 140. Mandrels can be any of various shapes and sizes depending on the desired shape of the product that is molded in the molding apparatus 140. The illustrated mandrel 200 comprises an inner core member 202 formed from a relatively rigid, lightweight material, such as a closed cell foam (e.g., polystyrene). The inner core member 202 desirably is covered on the top, bottom and one side by respective plywood panels 204a, 204b, and 204c, respectively. The plywood panels can be covered by a metal outer layer 206 formed from bent sheet metal. The side of the core member 202 opposite plywood panel 204c can be covered by a fiberglass panel 208. The ends of the core member (not shown) also can be covered by respective fiberglass panels (not shown). In use, the mandrel 200 is placed in the mold 142 such that the fiberglass panel 208 abuts the inside surface of the mold 142. The outer surface of the metal skin 206 contacts the part being formed in the mold.

In the embodiment shown in FIG. 16, one side 210 of the mandrel extends at an acute angle relative to the bottom surface of the mandrel. The angled side of the mandrel is effective to form a ceiling 106 of the shell 102 that slopes downwardly away from the vehicle wall when installed in a vehicle (as shown in FIG. 10A). The opposite side 212 of the mandrel can extend at an obtuse acute angle relative to the lower surface of the mandrel to allow for easier de-molding.

As can be seen in FIG. 16, the mandrel 200 is not provided with a recessed portion at its lower end for forming the shell flange 112 like the recessed portion 158 of mandrel 144. Instead, a separate insert 214 can be placed between the bottom surface of the mandrel and the floor of the mold to create a small gap or space that allows the flange 112 to be formed. In other embodiments, the mandrel 200 can be formed with such a recessed portion to eliminate the need for a separate insert 214.

One approach for forming the shell using the molding apparatus 140 is described as follows. First, the mandrels 144 are inserted into the mold, as depicted in FIG. 12. Second, one or more layers of fiberglass matting is positioned along the floor of the mold and the inner side surfaces of the mandrels. The fiberglass matting placed along the floor of the mold (which forms the end wall 110 of the shell) can be sewn or otherwise secured to the matting placed against the inner side surfaces of the mandrels (which form the side walls, ceiling and floor of the shell). Alternatively, the fiberglass matting can be loaded into the mold first, followed by placement of the mandrels into position adjacent the different sections of the fiberglass matting. Positioning of the fiberglass matting can include placing inserts 160 at the lower inside corners of the fiberglass matting, as best shown in FIG. 14.

FIGS. 19-21 show one example of a fiberglass "preform" 400, which comprises one or more layers of fiberglass matting. The preform 400 can include one or more pre-assembled sections that form the various parts of the shell of the slideroom. The preform 400 in the illustrated embodiment includes a base section 402 (which forms the end wall of the shell), and additional side sections 404, 406, 408, 410 that form the side walls, ceiling and floor of the shell. Each section 402-410 can comprise one or more layers of fiberglass matting (each section comprises two layers of fiberglass matting in the illustrated embodiment). Sections 408, 410 are secured to the base section 402 along stitch lines 412. Sections 404, 406 are secured to the base section 402 along stitch lines 414. Sections 404, 406, 408, 410 are therefore secured to the base section along their respective stitch lines and can be folded upwardly relative to the base section to be placed against the mandrels in the mold.

For example, the preform 400 can be placed on the floor of the mold 142 in the flat configuration shown in FIG. 19. The mandrels 144 can then be placed over the four edges of the preform 400 such that an edge portion of each side of the preform extends below the recessed portion 158 of a respective mandrel. Referring to FIG. 21, a first edge portion 416 of the preform formed by base section 402 and section 404 extends under the recessed portion 158 of a first mandrel; a second edge portion 418 formed by base section 402 and section 406 extends under the recessed portion 158 of a second mandrel; a third edge portion 420 formed by base section 402 and section 410 extends under the recessed portion 158 of a third mandrel; and a fourth edge portion 422 formed by base section 402 and section 408 extends under the recessed portion 158 of a fourth mandrel. After the mandrels 144 are positioned over the edge portions of the preform 400, the individual sections 404, 406, 408, 410 are folded upwardly relative to the base section 402 and held against the inner surfaces of the mandrels, such as by taping the sections of the preform to the mandrels. As can be appreciated, the edge portions 416, 418, 420, 422 underneath the recesses 158 of the mandrels form the integral flange 112 of the shell 102. Thus, each section of the flange 112 is formed by a portion of the base section, and a portion of one of the side sections 404, 406, 408, or 410 that overlays the portion of the base section.

As noted above, inserts or caul pates can be positioned against the inside corners of the preform 400 to ensure the formation of smooth corners during the resin injection process. FIG. 26 shows a detailed view of a corner caul plate assembly 159 comprising two horizontally disposed caul plates 160 secured to each other at right angles and a vertically upright caul plate 161 extending at right angles relative to the horizontal caul plates 161. The assembly 159 formed by caul plates 160, 161 can be placed against the inside corners of the preform 400 such that each horizontal plate 160 is placed against an inside corner formed by the edge of the base section 402 and the adjacent edge of one of the side sections 404, 406, 408, or 410 (which is folded upwardly relative to the base section). The vertical caul plate 161 is positioned against the vertical inside corner of the preform form by the adjacent vertical edges of two side sections. A respective assembly 159 can be placed at all four corners inside the preform 400.

As shown in FIG. 26, the horizontal plates 160 are relatively shorter than the length of each side of the preform 400. Thus, after four of the caul plate assemblies 159 are placed inside the preform, there can be gaps between the ends of two horizontal caul plates 160 that extend along the same edge of the base section 402. Additional caul plate sections can be placed along the edges of the base section 402 to fill in the gaps between the ends of the horizontal caul plates 160. This technique allows the same corner caul plate assemblies 159 to be used with preforms of different lengths and widths. For example, when a relatively longer or wider preform is used, relatively longer additional caul plate sections will be used to fill in the gaps between the corner caul plate assemblies 159.

As shown in FIGS. 14 and 27, the caul plate 160 has a curved inner face 160a that forms the curvature of the inside corner of the shell 102 between the end wall 110 and each of the floor 104, ceiling 106, and the side walls 108. The caul plate 160 also has an outer curved face 160b that engages the inner surface of the vacuum bag 152. The caul plates 160, 161 are shaped to maximize contact with the inner surface of the vacuum bag when a vacuum is established inside of the mold in order to prevent or at least minimize the creation of resin rich areas along the corners of the preform.

After the preform, mandrels and caul plates are positioned in the mold, the vacuum bag 152 is placed in the mold, as depicted in FIG. 13. The flange portion 156 of the vacuum bag forms a seal with the upper surfaces of the mandrels and/or of the upper surface of the mold 142.

After the vacuum bag is placed in the mold, a vacuum is created in the space between the vacuum bag and the adjacent surfaces of the mandrels and the mold floor, which space is occupied by the fiberglass preform. The vacuum can be created by fluidly connecting a vacuum pump to one or more fluid ports (not shown) in the vacuum bag and/or the mandrels. As a vacuum is drawn inside of the vacuum bag, a suitable resin is injected into the space occupied by the fiberglass matting, such as via an injection port 168 at the bottom of the vacuum bag or one or more injection portions 168 that extend through mandrels 144 (as shown in FIG. 14). The vacuum causes the resin to flow over and through the fiberglass matting. The bottom of the mold 142 can be heated to facilitate the flow of resin through the space occupied by the fiberglass matting. Thereafter, the resin is allowed to solidify to form the shell 102 of the slide-room.

The interior panels 114 of the slide-room can be vacuum bonded to the interior surfaces of the shell 102. For example, FIG. 17 shows the interior panels 114 being placed against respective surfaces inside the shell. An adhesive layer can be formed between the interior panels and the inside surfaces of the shell by placing a suitable adhesive (e.g., urethane adhesive) on the interior panels before they are inserted into the shell. As shown in FIG. 18, a vacuum bag 300 can then be placed against the interior panels. An upper flange portion 302 of the vacuum bag forms a seal against the inner surfaces of the shell above the interior panels 114. A vacuum can then be drawn on the space below the vacuum bag to cause the vacuum bag to press outwardly against the interior panels, which facilitates bonding of the interior panels 114 to the shell 102.

Figure 23:
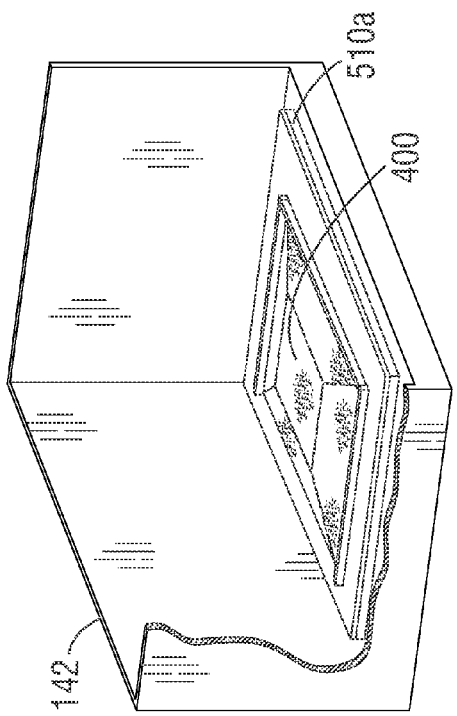
FIG. 23 is a perspective view of the mold and the preform loading apparatus of FIG. 22, shown with the movable preform support in a retracted position.

FIGS. 22-25 show an apparatus 500 that can be used to assist in loading a preform 400 in the mold 142. The apparatus 500 comprises a preform loader 502 and a preform storage unit 504 mounted on top of the preform loader 502. The preform loader 502 comprises a base 506 and a moveable support, or tray, 508 that is movable relative to the base 506 in a horizontal direction between a retracted position (FIG. 25) and an extended position (FIG. 24). The storage unit 504 stores a plurality of vertically stacked preform supports, or trays 510a, 510b, 510c, 510d, each of which can support a respective preform 400. Each tray 510a-510d can be supported in a horizontal position within the storage unit using conventional mechanisms, such as brackets 512 secured to the inner vertical surfaces of the storage unit, as best shown in FIG. 23. Each tray 510a-510d (and corresponding preform 400) is removable from the storage unit 504 for placement on the moveable support 508 when a preform 400 is ready to be loaded into the mold 142.

For example, when loading a preform into the mold using apparatus 500, the apparatus is moved adjacent to an opening in one side of the mold 142. The opening in the mold 142 can be provided, for example, by removing an end wall or side wall of the mold. The moveable support 508 is then partially extended from the base 502 to allow the lowermost tray 510a (with corresponding preform 400) to be pulled from the storage unit 504 onto the support 508. Referring to FIG. 24, the support 508, the tray 510a and corresponding preform 400 are then moved through the opening in the mold by fully extending the support 508 relative to the base 502. When the preform 400 is in the desired position within the mold, the preform is held in place relative to the floor of the mold (e.g., manually or securing an end of the preform to the floor of the mold) while the support 508 and the tray 510a are retracted out of the mold 142. After the molding process is complete and the cured shell is removed from the mold, another preform 400 in the storage unit 504 (e.g., preform 400 on tray 510b) can be loaded into the mold in the same manner.

Figure 28:
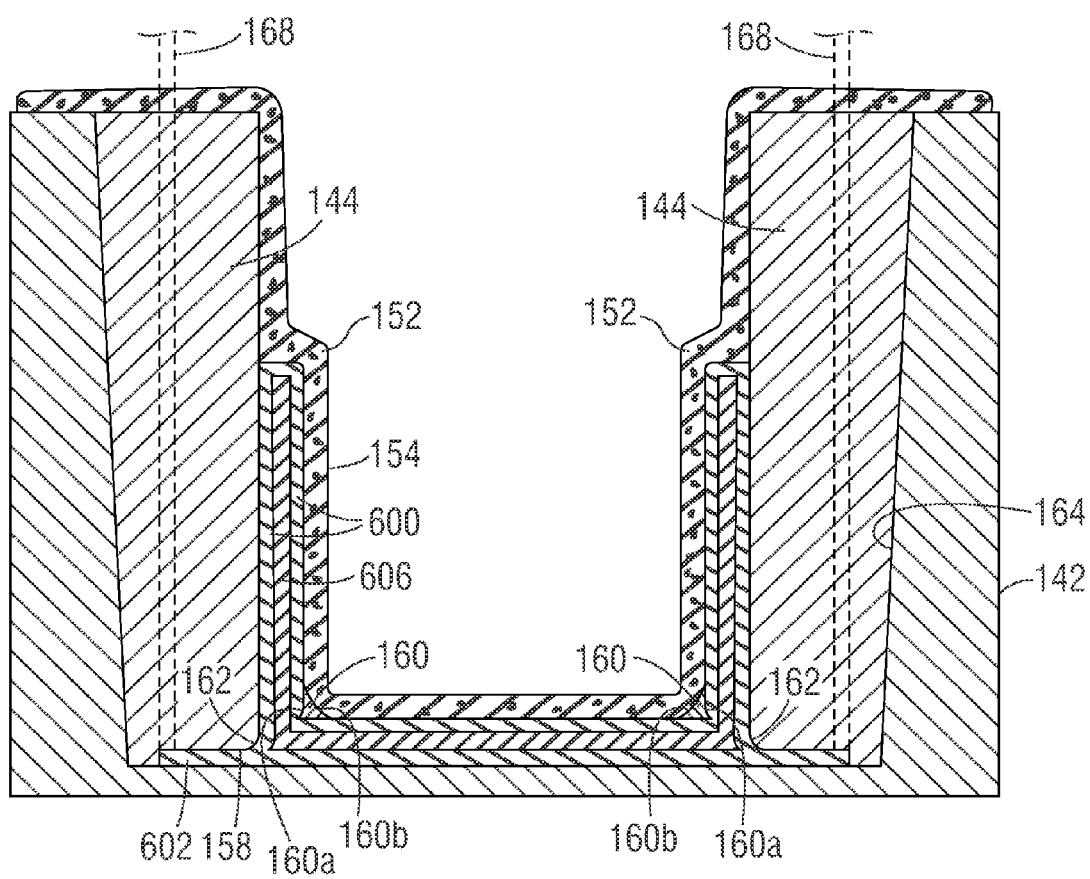
FIG. 28 is a cross-sectional view of a mold assembly being used to form a fiberglass shell that encapsulates an internal core portion.

FIG. 28 shows an example of a "cored" shell 600 being formed in the mold 142. In this embodiment, a preform comprised of multiple sections of fiberglass matting is placed around an inner core 606 (constructed from the same materials that are used to form interior panels 114). The core 606 can comprise multiple sections (e.g., five separate panels like panels 114) or a single unitary structure. In any event, the resin transfer process causes resin to flow over and through the preform, effectively encapsulating the core 606 in the fiberglass shell 600. This process obviates the separate step of bonding individual panels 114 to the inside of the cured shell 102.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A slide-room comprising:
    a shell comprising an end wall, a ceiling, a floor, two opposing side walls, and a flange extending from the end wall, wherein the end wall, the ceiling, the floor, the side walls and the flange comprise a one-piece, unitary construction; and
    wherein at least one of the ceiling, the floor, and the side walls is formed from one or more layers of fiberglass matting that also form part of the flange, wherein the one or more layers of fiberglass matting transitions from the at least one of the ceiling, the floor, and the side walls to the flange without forming a 90-degree corner.

2. The slide-room of claim 1, wherein the flange has an outer surface that is co-planar with an outer surface of the end wall.

3. The slide-room of claim 1, wherein the shell comprises outside corners formed by the intersection of each of the ceiling, the floor, and the side walls with the end wall, and the flange extends beyond each of the outside corners of the shell.

4. The slide-room of claim 1, wherein the shell comprises outside corners defined by the intersection of each of the ceiling, the floor, and the side walls with the end wall, the outside corners being curved.

5. The slide-room of claim 1, wherein the one or more layers of fiberglass matting are curved where they transition from the at least one of the ceiling, the floor, and the side walls to the flange.

6. The slide-room of claim 1, wherein the end wall is formed from one or more additional layers of fiberglass matting that extend into the flange and overlap the one or more layers of fiberglass matting that extend from the at least one of the ceiling, the floor, and the side walls.

7. The slide-room of claim 3, wherein the flange has an outer surface and the entire extent of the outer surface of the flange is co-planar with an outer surface portion of the end wall that is immediately adjacent the flange.

8. The slide-room of claim 2, wherein substantially the entire extent of the outer surface of the flange is flat.

9. The slide-room of claim 8, wherein the flange has an inner surface and substantially the entire extent of the inner surface of the flange is flat.

10. A vehicle comprising:
    a vehicle wall comprising a slide-room opening; and
    a slide-room installed in the opening and operable to move between a retracted position disposed mostly inside of the vehicle and an extended position extending outwardly from the vehicle wall, the slide-room comprising a fiberglass shell comprising an end wall, a ceiling, a floor, two opposing side walls, and a flange extending from the end wall and overlapping an outer surface of the vehicle wall, wherein the end wall, the ceiling, the floor, the side walls and the flange comprise a one-piece, unitary construction;

wherein the flange has an outer surface that is co-planar with an outer surface portion of the end wall that is immediately adjacent the flange.

11. The vehicle of claim 10, wherein the flange extends beyond outside corners of the shell formed by the intersection of each of the ceiling, the floor, and the side walls with the end wall, and wherein the entire extent of the outer surface of the flange is co-planar with the outer surface portion of the end wall that is immediately adjacent the flange.

12. The vehicle of claim 10, wherein the ceiling slopes downwardly from the vehicle wall to the end wall of the shell.

13. The vehicle of claim 10, wherein the shell comprises outside corners defined by the intersection of each of the ceiling, the floor, and the side walls with the end wall, the outside corners being curved.

14. The vehicle of claim 10, wherein at least one of the ceiling, the floor, and the side walls is formed from one or more layers of fiberglass matting that also form part of the flange.

15. The vehicle of claim 14, wherein the one or more layers of fiberglass matting transitions from the at least one of the ceiling, the floor, and the side walls to the flange without forming a 90-degree corner.

16. The vehicle of claim 14, wherein the end wall is formed from one or more additional layers of fiberglass matting that also form part of the flange.

17. The vehicle of claim 10, wherein substantially the entire extent of the outer surface of the flange is flat.

18. The vehicle of claim 17, wherein the flange has an inner surface facing the outer surface of the vehicle wall, and substantially the entire extent of the inner surface of the flange is flat.

19. A vehicle comprising:
a vehicle wall comprising a slide-room opening; and
a slide-room installed in the opening and operable to move between a retracted position disposed mostly inside of the vehicle and an extended position extending outwardly from the vehicle wall, the slide-room comprising a fiberglass shell comprising an end wall, a ceiling, a floor, two opposing side walls, and a flange extending from the end wall and overlapping an outer surface of the vehicle wall, wherein the end wall, the ceiling, the floor, the side walls and the flange comprise a one-piece, unitary construction;
wherein the flange extends beyond outside corners of the shell formed by the intersection of each of the ceiling, the floor, and the side walls with the end wall;
wherein the flange has an outer surface and the entire extent of the outer surface of the flange is co-planar with an outer surface portion of the end wall that is immediately adjacent the flange;
wherein substantially the entire extent of the outer surface of the flange is flat;
wherein the flange has an inner surface facing the outer surface of the vehicle wall, and substantially the entire extent of the inner surface of the flange is flat;
wherein at least one of the ceiling, the floor, and the side walls is formed from one or more layers of fiberglass matting that also form part of the flange, wherein the one or more layers of fiberglass matting transitions from the at least one of the ceiling, the floor, and the side walls to the flange without forming a 90-degree corner.

\* \* \* \* \*